United States Patent [19]
Ziarno

[11] Patent Number: 5,869,825
[45] Date of Patent: *Feb. 9, 1999

[54] METHOD OF PROCESSING MONETARY TRANSACTION DATA BY BATCH OFF-LOADING OF THE DATA FROM A PORTABLE, HAND-HELD ELECTRONIC DEVICE, DEVICE AND SYSTEM THEREFOR

[76] Inventor: Witold A. Ziarno, 4519 S. St. Louis, Chicago, Ill. 60632

[*] Notice: The term of this patent shall not extend beyond the expiration date of Pat. No. 5,665,952.

[21] Appl. No.: 814,090

[22] Filed: Mar. 10, 1997

Related U.S. Application Data

[63] Continuation-in-part of Ser. No. 508,743, Sep. 21, 1995, Pat. No. 5,665,952, Ser. No. 318,914, Oct. 5, 1994, which is a continuation-in-part of PCT/US94/09915 Sep. 6, 1994, Ser. No. 555,506, Nov. 8, 1995, Ser. No. 127,770, Sep. 28, 1993, abandoned, Ser. No. 117,909, Sep. 7, 1993, abandoned, and Ser. No. 402,622, Mar. 13, 1995.

[51] Int. Cl.⁶ .................................................. G06K 5/00
[52] U.S. Cl. ............................................... 235/380; 705/1
[58] Field of Search ................................... 235/380, 379, 235/385, 472; 902/4, 22; 705/1

[56] References Cited

U.S. PATENT DOCUMENTS 5,303,393  4/1994  Noreen et al. ............................ 455/3.2

OTHER PUBLICATIONS

Romano, William, Non–profit software package directory (Buyers Guide), fundraising, management, v21, n8, p32(16), pp. 1–41, Oct. 1990.

*Primary Examiner*—Michael G. Lee
*Attorney, Agent, or Firm*—Witold A. Ziarno

[57] ABSTRACT

The present invention provides a method, device and system of monetary transaction processing. The method includes the steps of entering and recording on the portable, self-powered, hand held monetary transaction processing device a plurality of monetary commitments consisting of a numerical amount and indicia read from an information bearing card. The method includes the step of batch off-loading of the data from the portable, self-powered, hand held monetary transaction processing device to a second device. Recordation of a plurality of monetary transactions is uninterrupted by verification of validation and/or authorization.

20 Claims, 6 Drawing Sheets

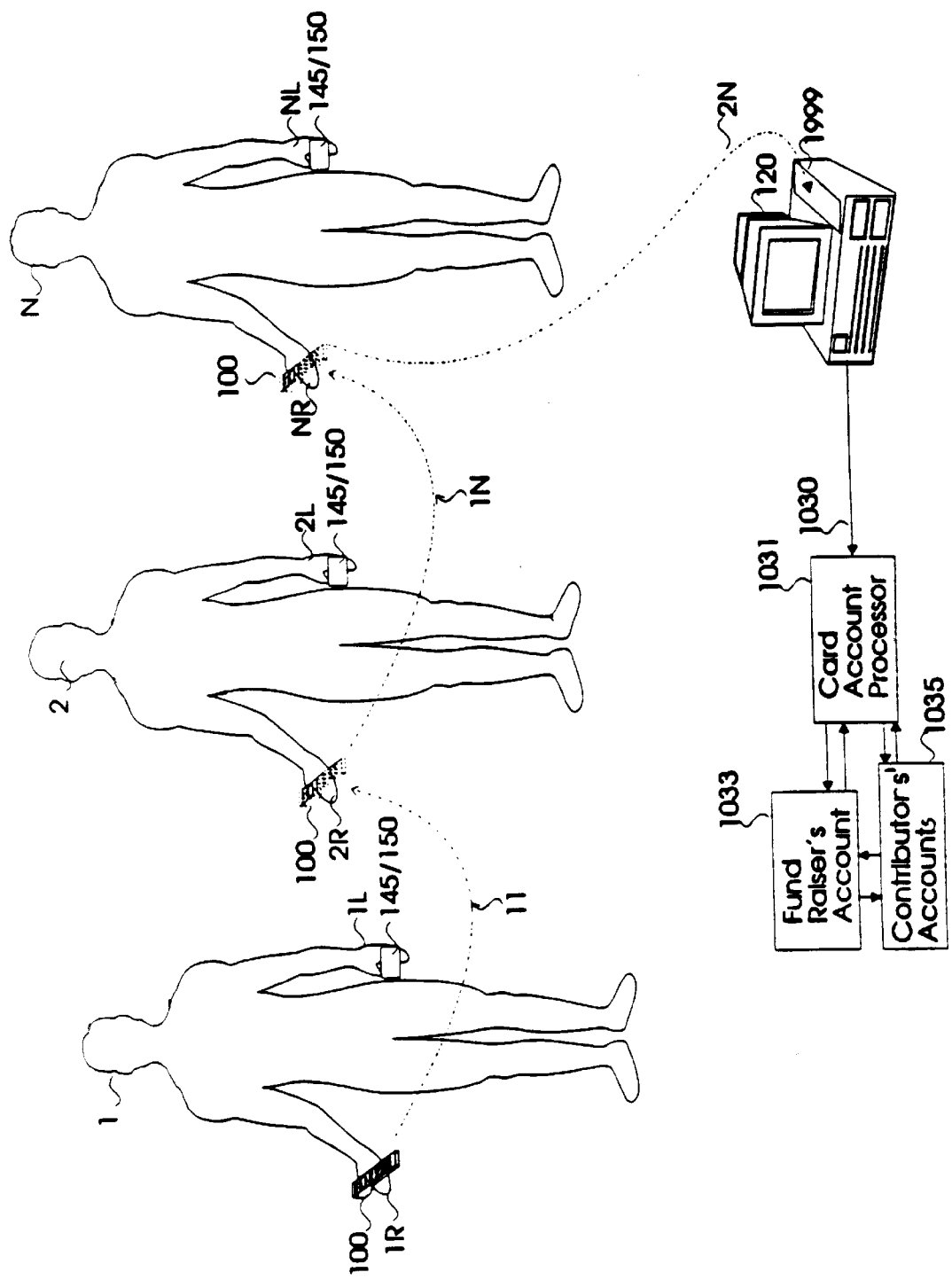

METHOD OF PROCESSING MONETARY TRANSACTION DATA BY BATCH OFF-LOADING OF THE DATA FROM A PORTABLE, HAND-HELD ELECTRONIC DEVICE, DEVICE AND SYSTEM THEREFOR

CROSS-REFERENCE TO RELATED APPLICATIONS (Claiming Benefit Under 35 U.S.C. 119 and 120)

This application is a continuation-in-part of U.S. patent application Ser. No. 08/508,743, filed on Sep. 21, 1995 now U.S. Pat. No. 5,665,952, U.S. patent application Ser. No. 08/318,914, filed Oct. 5, 1994, and PCT patent application U.S. Ser. No. 94/09915 filed Sep. 6, 1994, U.S. patent application Ser. No. 08/555,506 filed Nov. 8, 1995, U.S. patent application Ser. No. 08/127,770 filed Sep. 28, 1993, now abandoned, and U.S. patent application Ser. No. 08/117,909 filed Sep. 7, 1993, now abandoned. This application is also a continuation in part patent application of patent application Ser. No. 08/402,622 filed by Witold A. Ziarno on Mar. 13, 1995.

BACKGROUND

Technical Field: The invention further provides a method of monetary transaction processing that is generally applicable and not limited by the type of monetary transaction involved. This invention relates generally to method of streamlining the acknowledgement of a multiplicity of monetary transactions made at a plurality of remote locations to recipients thereof, and device and system therefor.

SUMMARY OF THE INVENTION

These and other objects of the present invention are achieved in method of monetary transaction processing. The method includes the steps of entering and recording on a portable, self-powered, hand held monetary transaction processing device a plurality of monetary commitments consisting of a numerical amount and indicia read from an information bearing card. The method includes the step of batch off-loading of the data from the portable, self-powered, hand held monetary transaction processing device to a second device. Recordation of a plurality of monetary transactions is uninterrupted by verification of validation and/or authorization.

In a variant, the second device is a central processing location device, and the method includes the step of acknowledging the monetary transactions from a remote data processing location device from where the monetary transactions were entered, in which there is no verification of validation and/or authorization at the portable, self-powered, hand held monetary transaction processing device but at some device other than the portable, self-powered, hand held monetary transaction processing device.

The method also comprises the step of entering credits to accounts for the monetary transactions to recipients of the monetary transactions, and entering debits to accounts for the monetary transactions to makers of the monetary transactions.

A system for simplifying the management of a multiplicity of monetary transaction commitments made at remote locations is also provided. The system includes a portable, self-powered, hand held monetary transaction processing device having means for entering and recording on the portable, self-powered, hand held monetary transaction processing device a plurality of monetary commitment data consisting of a numerical amount and indicia read from an information bearing card, a second device, and means for batch off-loading of the data from the portable, self-powered, hand held monetary transaction processing device to the second device whereby recordation of each monetary transaction is uninterrupted by verification of validation and/or authorization.

The invention also includes a portable, self-powered, hand held monetary transaction processing device. The device includes means for entering and recording on the portable, self-powered, hand held monetary transaction processing device a plurality of successive monetary commitment data consisting essentially of a numerical amount and indicia read from an information bearing card, and means for batch off-loading of the data from the portable, self-powered, hand held monetary transaction processing device to the second device whereby recordation of each monetary transaction is uninterrupted by verification of validation and/or authorization.

These and other objects will become apparent in the course of a detailed description of the invention.

DETAILED DESCRIPTION OF THE PREFERRED EMBODIMENTS

Figure 1:
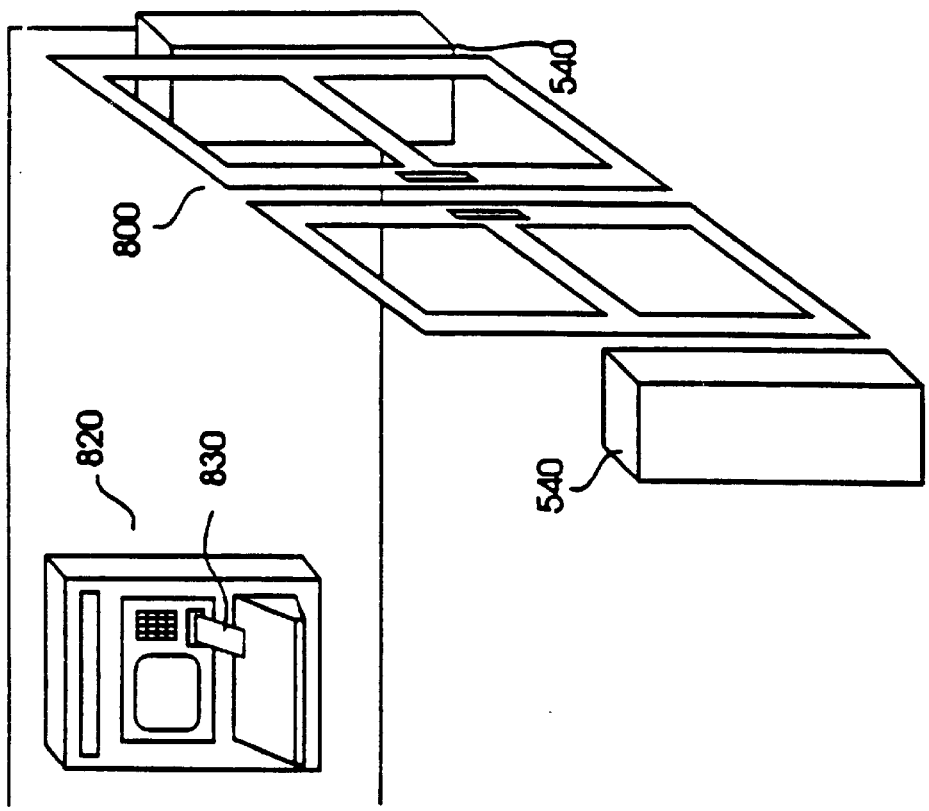
FIG. 1 is a diagram illustrating an overall system of monetary transactions processing according to the present invention.
Figure 1:
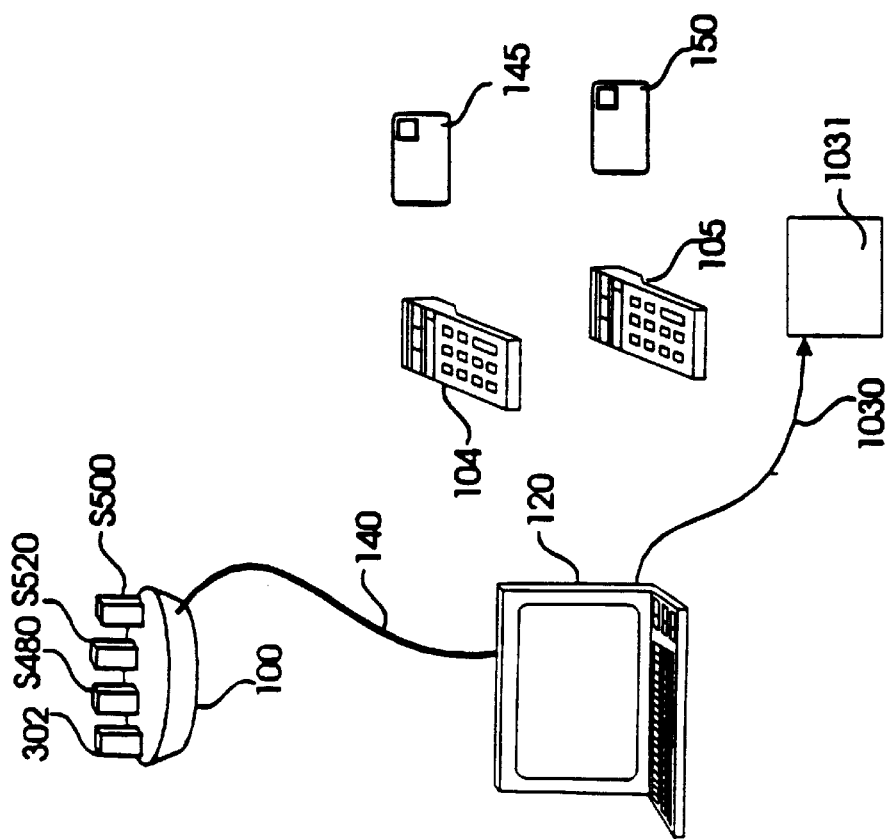

FIG. 1 illustrates an overall configuration of a monetary transactions device network according to the present invention. An electronic monetary transactions processing device 100 or peripheral 100 is used by a recipient for the solicitation and receiving of monetary transaction commitments made by information bearing card such a credit card or debit card.

An example of an information bearing card is a credit card including, credit cards issued by an organization. Such cards are: VISA, MasterCard, Discover, and an American Express cards. An information bearing card as used herein refers also to a debit card including, by way of example, a Cirrus card, a Plus card, a Maestro card, an Interlink card, and any other type of card that can be used for an electronic fund transfer. The term "card" also contemplates a private label card issued or maintained by a recipient or affiliate of a recipient, and a prepaid card that can be purchased by cash, check, credit, or debit cards. An information bearing card can be a credit card, debit card, or combination thereof. Different information bearing cards are used herein including magnetic striped cards and cards having electronic circuits thereon.

Electronic monetary transactions processing device 100 or peripheral 100 mounts a card processor 160/240 that processes monetary transactions, and a card reader and accompanying circuitry that reads smart cards, e.g. PCMCIA cards, JEIDA/PCMCIA compliant memory cards, IC cards, GEC Card Technology LTd. IC cards, West Midlands, U.K. and/or Gemplus Card Services memory and microprocessor cards. The present invention contemplates the use of contact less IC cards, e.g. such as those available from Mitsubishi Electric UK Ltd., Hatfield UK, and Oakwood design, Letchworth UK, and the like. Other forms of information bearing cards are also usable with electronic monetary transactions processing device 100 or peripheral 100 embodiments.

Figure 2:
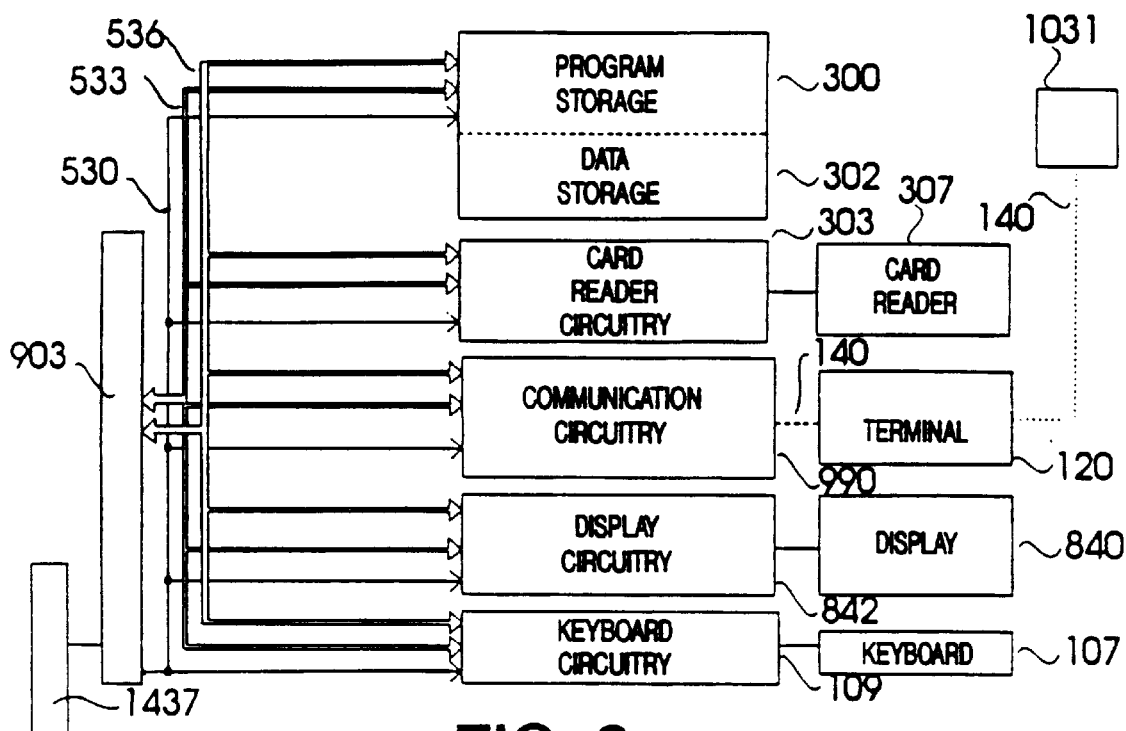
FIG. 2 is a schematic block diagram of an electronic monetary transactions processing device or peripheral with various additions.

The electronic monetary transactions processing device 100 or peripheral 100, FIGS. 1 and 2, accepts a credit card 145, and/or a debit card 150. Electronic monetary transactions processing device 100 or peripheral 100 collects, stores, and provides information about a maker. In the embodiment of FIG. 1, the electronic monetary transactions processing device 100 or peripheral 100 is a portable unit with a wire-less communication link 140. The electronic monetary transactions processing device 100 or peripheral 100 is a portable hand-held unit with a wire-less communication link 140. Using a communication link 140, preferably an RF (radio frequency) communication link, an infra-red communication link or other free-propagating electromagnetic energy communication link, the electronic monetary transactions processing device 100 or peripheral 100 communicates information about a monetary commitment maker and the monetary transaction to a terminal or peripheral 120 in the embodiment shown.

In another embodiment, the electronic monetary transactions processing device 100 or peripheral 100 immediately; at once; without delay; directly; forthwith; or combination thereof, records the information about the monetary transaction maker and the monetary transaction or a plurality of successive, sequential, in line, and/or in succession users' and their corresponding monetary monetary transactions, e.g. each users' respective card information and respective information representative of a numerical monetary transaction amount for each respective monetary transaction maker, it has accepted in a data storage 302, and then at a later time it can be off-loaded and communicated to recipient's terminal or peripheral 120 via communication circuitry 990 (FIG. 1a) and a communication link 140, e.g. after a single event or after a full day of such events. Terminal or peripheral 100 and/or terminal or peripheral 120 is optionally programmed to correlate sequential, serial, continuously made, consecutively made, chain of, and/or string of data sets of information that identify the specific event with monetary transaction maker data sets comprised of monetary transaction information. As such, the users' acknowledgments of the monetary transactions will identify the event, recipient of the monetary transactions, as appropriate. The terminal or peripheral 120 can be located on-site or at some remote location. The terminal or peripheral 120 communicates the information about the successive, systematic, in order, and/or in regular order users and their respective monetary transactions, or a plurality of users and their corresponding numerical monetary transaction amounts, e.g. card information and information representative of a numerical monetary monetary transaction amount for each respective monetary transaction maker, via a communication link 1030, which by way of example, can be a telephone hookup, with a card account processor 1031, or the like. A card account processor can also be a funds processing telecommunications network, third party card processor, a bank, or a combination thereof. A card account processor can also be computer network, e.g. the Internet, VISA Net, a merchant bank, a card processing bank or organization, or a combination thereof.

Figure 4:
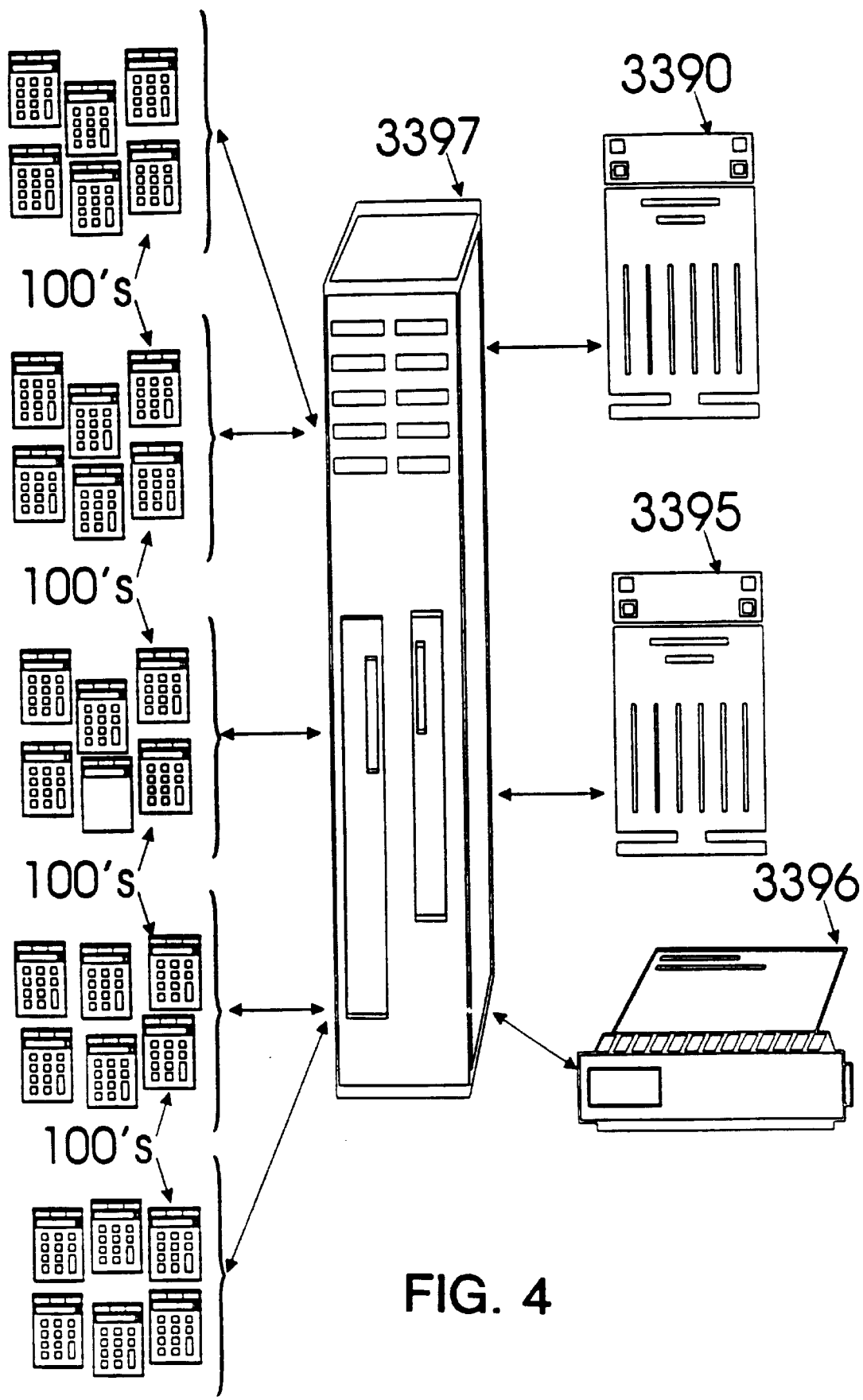
FIG. 4 is a perspective view of a system for simplifying the acknowledgment of a plurality of monetary transactions made at remote locations on management terminals or peripherals; and, FIG. 5 illustrates a method of obtaining monetary transactions.

An embodiment of the electronic monetary transactions processing device 100 or peripheral 100 is hand-held and comprises a card reader 307, means for manually entering a monetary transaction amount, an optional visual display 840 for displaying numerical information of the amount entered, an on-board battery power source (preferably, a rechargeable battery power source) 1437, a data storage 302, and an optional program storage. Preferably the case of the monetary transaction processing device 100 or peripheral 100 is of a size and shape to easily fit into the palm of a user's hand. The monetary transaction maker's thumb can rest on a side wall of the case of the electronic monetary transactions management terminal 100 or peripheral 100 and other fingers on the same hand can bear against a second side wall of an opposite side of the case of the electronic monetary transactions processing device 100 or peripheral 100. This allows the monetary transaction maker to easily hold the electronic monetary transactions processing device 100 or peripheral 100 in one hand. The size and shape of the electronic monetary transactions processing device 100 or peripheral 100 also assists in the passing of the electronic monetary transactions processing device 100 or peripheral 100 from one monetary transaction maker to another (FIG. 1). It will be further understood that the optional size and shape of the case of the hand-held electronic monetary transactions processing device 100 or peripheral 100 further allows for the monetary transaction maker to hold the terminal in one hand while being able to pass an information bearing card, for example a credit card or a debit card, with the monetary transaction maker's other hand through a card reader on the electronic monetary transactions processing device 100 or peripheral 100 (FIGS. 1 and 4).

An embodiment of electronic monetary transactions processing device 100 or peripheral 100 communicates information about successive users, e.g. card information, and the monetary transaction amount, e.g. numerical monetary amount information, or a plurality of monetary transaction makers and their corresponding monetary transactions, e.g. card information for each respective monetary transaction maker and information representative of a numerical monetary amount for each respective monetary transaction maker, directly via a communication link 1030, for example, a telephone hookup, thereby bypassing the terminal or peripheral 120 to a funds processing database 1031, and the like. The card account 1035 of the monetary transaction maker is appropriately charged the amount of the monetary transaction, or debited for the monetary transaction, as appropriate, and the account of the organization 1033 is augmented respectively (FIGS. 1 and 4).

An example of an electronic monetary transactions processing device 100 or peripheral 100 optionally has a credit card processor 160, and/or a debit card monetary transaction processor 240. Such a processor directly utilizes a cellular communication link, or other standard telephone hookup. The electronic monetary transactions processing device 100 or peripheral 100 immediately records successive, sequential, in line, and/or in succession users' card account and monetary transaction information in a data storage 302. After the event or day (or a portion thereof) of recording monetary transactions, a communication link 1030 is connected directly to a processor 160/240 and/or data storage 302, and communication circuitry 990 via a communication link 1030 transfers monetary transaction maker information to a card account processor 1031, and the like. The card account of the monetary transaction maker 1035 is appropriately charged or debited the amount of the monetary transaction and the account of the organization 1033 is augmented respectively (FIG. 1).

A monetary transaction can be made on an off-line electronic monetary transactions processing device 100 or peripheral 100. The electronic monetary transactions processing device 100 or peripheral 100 does not interpose a request, or requests, for an authorization or verification, an authorization step, pre-authorization step, verification step, or combination thereof, between the making, entering, immediate recording, or combination thereof, of a monetary transaction made by a first monetary transaction maker, and subsequent monetary transactions made by a plurality of subsequent monetary transaction makers.

In yet another variant of the method of the present invention, the terminal 100, the peripheral 100, the network, and/or the system described herein optionally have a mode of operation in which consecutive data sets are entered, and/or recorded uninterrupted, uninterferred with, uncut in on, unbroken in on, unimpeded, and/or uniformly entered, and or recorded.

In another embodiment of the method disclosed herein, the terminal 100 or peripheral 100 does not interpose a request for an authorization or verification, an authorization step, pre-authorization step, verification step, or combination thereof, between the making of a sub-group of monetary transactions within a group of monetary transactions (N) made by monetary transaction maker, through monetary transaction maker$_{N-1}$, e.g. at a single event such or recordation session. By way of example, there may be several hundred cardholder monetary transactions, e.g. N=500. Sequential monetary transactions are made by monetary transaction maker 1 to monetary transaction maker 500 prior to interposing a request for an authorization or verification, an authorization step, pre-authorization step, verification step, or combination thereof. In another variant, a sequential monetary transactions are made by monetary transaction maker 1 to monetary transaction maker 500 prior to interposing a request for an authorization or verification, an authorization step, pre-authorization step, verification step, or combination thereof, between monetary transaction 10 and monetary transaction 11, monetary transaction$_n$ (where n is an integer greater than 10) and monetary transaction$_{n+1}$, or combination thereof. Electronic monetary transactions processing device 100 or peripheral 100, terminal or peripheral 120, a card account processor 1031 (including a clearing organization and/or an issuing organization), terminal network, or combination thereof, post monetary transaction processes card information and monetary transaction numerical amount information. Post monetary transaction processing may include a request for authorization or verification, an authorization step, pre-authorization step, verification step, or combination thereof. It will be understood that a plurality of sequential monetary transactions made by a first monetary transaction maker, a second monetary transaction maker, and . . . nth monetary transaction maker can be made at a electronic monetary transactions processing device 100 or peripheral 100 off-line before the information representative of the monetary transactions, e.g. card information and numerical monetary transaction amount information, is off-loaded from an off-line electronic monetary transactions processing device 100 or peripheral 100 to card account processor 1031, terminal or peripheral 120, or combination thereof, for processing and authorization. It is further understood that the speed with which a multiplicity of sequential monetary transactions can be accepted from a large group of sequential monetary transaction makers is greatly accelerated since a request for authorization or verification, an authorization, pre-authorization, verification step, or combination thereof, is not interposed between an entry of card information and entry of a numerical monetary monetary transaction amount by each respective monetary transaction maker.

By way of example, there may be several thousand cardholder monetary transaction makers at an event or recordation session. Electronic monetary transactions processing device 100 or peripheral 100$_1$ through electronic monetary transactions processing device 100$_X$ (where X is an integer) are circulated, interspersed, or dispersed among the prospective cardholding monetary transaction makers. Successive sequential, in line, and/or in succession monetary transactions are made on and immediately recorded on electronic monetary transactions processing devices of peripherals 100 by each respective cardholding monetary transaction maker desiring to do so. Each respective electronic monetary transactions processing device 100 can receive several hundred successive, systematically entered, in order, and/or in regular order monetary transactions without need of input of additional information. Tens of hundreds of monetary transactions are received at one event or recordation session by management terminals 100$_{1-X}$. These tens of hundreds of monetary transactions are then off-loaded at the end of such an event from the electronic monetary transactions processing devices 100$_1$ to 100$_X$ for further processing as described above. It will be seen that literally tens of hundreds of monetary transactions can be received from cardholder monetary transaction makers in a single recordation session. The apparatus and method of the invention are highly efficient in receiving possibly tens of thousands of dollars of monetary transactions within a single event, the event lasting a matter of hours.

The request for authorization or verification, authorization step, verification step, or combination thereof, is optionally decoupled from each respective monetary transaction at the time the entry of a respective user's respective card information and monetary transaction amount information is entered, immediately recorded, or combination thereof, into a electronic monetary transactions processing device 100 or peripheral 100.

It will be further understood that a plurality of monetary transactions can be accepted in a short amount of time utilizing this procedure and mode of operation of terminal 100 or peripheral 100 and that monetary transactions that are later found to be unauthorized can be discarded and only authorized monetary transactions are then credited to a recipient's account and debited to a monetary transaction maker's account. It is also possible to store the group of unauthorized transactions so that the makers making these monetary transactions can be contacted to resubmit their respective monetary transactions.

The dispersion, circulation, or combination thereof, of a plurality of terminals 100 or peripherals 100 among a group of users for the immediate recordation of monetary transactions is preferred in the method of the present invention. Dispersion, circulation, or the combination thereof, of a plurality of terminals or peripherals 100 increases the speed within which a multiplicity of monetary transactions are recorded on the terminals, and allows for a significant improvement in the immediacy and interplay between a recipient and a user, thus increasing the satisfaction with the process. The device and method can be used where monetary transactions for tickets (parking or moving violation), tuition, registration for school, etc. are made.

At or near an entrance or exit, as shown in FIG. 1, of a place where a recordation event is held, there can be located a receipt generator 820. The receipt generator 820 produces a receipt for an individual monetary transaction or a plurality of respective individual monetary transactions. In a variant terminal 100 or peripheral 100 transmits card information and monetary transaction amount information to receipt generator 820 via a wireless communication link for successive users who elect to obtain a receipt for their monetary transaction at or near the time their respective monetary transaction was entered onto electronic monetary transactions processing device 100 or peripheral 100. In a variant, receipt generator 820 is located at a remote location from electronic monetary transactions processing device 100 or peripheral 100, and is a portable electronic battery operated unit. The location of the receipt generator 820 at a location remote from terminals 100 or peripherals 100 increases the speed within which monetary transactions are made and immediately recorded on terminals 100 or peripherals 100. This is desirable given the short amount of time generally allocated to monetary transaction recordation sessions.

The receipt 830 is used to substantiate a monetary transaction or a plurality of successive monetary transactions made by a single monetary transaction maker over a period of time, or by a plurality of successive users made over a period of time. Substantiation may be required to receive a tax benefit from a governmental taxing authority, e.g. the Internal Revenue Service, or a state or local taxing or tax processing body. By way of example, a computer 3397 (FIG. 4) records the monetary transactions made by user X over a period of time, e.g. one year, 6 months. After a period of time, monetary transactions made by user X are automatically processed by computer 3397 in its mode of operation, e.g. an expert software scheme, and monetary transaction maker X is sent an acknowledgment, corroboration, affirmation, or recognition by way of printer 3396 listing monetary transactions that are in the register. It is understood that monetary transactions made by user X to a multiplicity of recipients can be easily processed in this manner. Further, it is understood that a multiplicity of users can have monetary transactions that are made to a multiplicity of recipients of monetary transactions assembled, processed and acknowledged this way. One of the benefits of the automated acknowledgment process involves developing monetary transaction maker loyalty to a particular recipient, and substantially decreased effort on the part of the user in assembling records needed for justification of deductions made to a plurality of recipients. Data sets described herein are optionally entered, made, and/or sequentially, in series, continuously, consecutively, as a chain, and/or as a string. Further data sets described herein optionally consist essentially of monetary transaction maker identity information, monetary transaction maker numerical monetary transaction amount information, tax deductibility status information, or combination thereof.

Electronic monetary transactions processing device 100 or peripheral 100 can communicate via a communication link, preferably an RF (radio frequency) communication link or an infra-red communication link, with the receipt generator 820. Electronic monetary transactions processing device 100 or peripheral 100 can instead communicate monetary transaction and monetary transaction maker information, via a communication link to a recipient's terminal or peripheral 120. Terminal or peripheral 120 then communicates the monetary transaction maker and monetary transaction information to a receipt generator 820. The communication consists of information about the monetary transaction maker, the monetary transaction, the date, data sets comprised of whether or not the monetary transaction qualifies for a tax deduction, and the like. The communication consists of the same type of information wherein card information and monetary transaction information is associated for each respective monetary transaction maker where a large group of monetary transaction makers make monetary transactions via electronic monetary transactions processing device 100 or peripheral 100 prior to transmitting the information to a card account processor 1031.

Upon receipt of the communication, the receipt generator 820 processes the information about the monetary transaction maker, the monetary transaction, or the data sets comprised of the status of the monetary transaction in terms of whether or not it qualifies for a tax deduction to generate a receipt 830. The receipt 830 may be generated automatically by the receipt generator 820 to be picked up by the monetary transaction maker or attender of a monetary transaction processing or social event after an event or recordation of a monetary transaction, or may be generated at the request of the monetary transaction maker or attender after the event as the monetary transaction maker is leaving the place of monetary transaction, or may be generated for mailing or faxing to the monetary transaction maker or attender. A monetary transaction maker may desire the receipt 830 for tax purposes or for determining if the monetary transaction maker is meeting a monetary transaction quota.

The present invention also contemplates optionally locating the receipt generator 820 on an electronic monetary transactions processing device 100 or peripheral 100, and generating receipt 830 at electronic monetary transactions processing device 100 or peripheral 100.

In yet another embodiment of the method of the invention a record of the monetary transaction is generated at a card account processor 1031, a bank, or combination thereof, and forwarded to a monetary transaction maker. A receipt for a monetary transaction appears on a user's monthly credit card statement, bank statement, or combination thereof. Optionally, an annual, or after some other appropriate time period, a statement is forwarded to a respective monetary transaction maker itemizing all monetary transactions given. The format of the statement can be such that a tax processing entity, e.g the IRS, will accept the information for substantiating the monetary transaction or group of monetary transactions at issue, and/or grant a deduction. It will be understood that records of the monetary transaction transactions made by tens of hundreds of cardholder monetary transaction makers can easily be processed and forwarded to each respective monetary transaction maker of the tens of hundreds of monetary transaction makers for meeting monetary transaction quotas and for substantiating deductions and the like given at a plurality of management terminals 100.

Security for recordation sessions is provided by a theft deterrent 540 located at or near an entrance or exit of an event 800 to deter the theft of the electronic monetary transactions processing device 100 or peripheral 100. Theft deterrents are well known in the art. Security systems used in retail stores can be used, for example, the present invention contemplates that the electronic monetary transactions processing device 100 or peripheral 100 can contain a detectable element that can be detected by the theft deterrent 540. As such, if someone attempts to unlawfully take the electronic monetary transactions processing device 100 or peripheral 100 through an entrance or exit of a place of an event 800 or past a sensor, an audible or visible alarm signal, or the like, will be generated. A homing device can be placed on the terminal 100 or peripheral 100 to allow tracking of the terminal 100 or peripheral 100, e.g. a system comparable to systems used to trace stolen automobiles.

In conjunction with a printer, electronic management terminal 100 or electronic management peripheral 100, recipient's terminal or peripheral 120, or combination thereof, are used to generate a report commonly used for accounting purposes, including but not limited to a summary of total monetary transactions generated, a monthly statement, a histogram, a monetary transaction average per monetary transaction maker, sub-group of monetary transaction makers, or group of monetary transaction makers.

The terminal network of the present invention, which includes a hand-held electronic management terminal 100 or electronic management peripheral 100, a recipient's terminal or peripheral 120, a card account processor 1031, or combination thereof, collects, analyzes, and visually displays statistical information associated with an individual monetary transaction, successive monetary transactions immediately recorded thereon, a tally of individual monetary transactions, or combination thereof. The electronic monetary transactions processing device 100 or peripheral 100 contains an optional statistical information collecting routine, a set of software routines which run on processing circuitry 903.

Figure 1A:
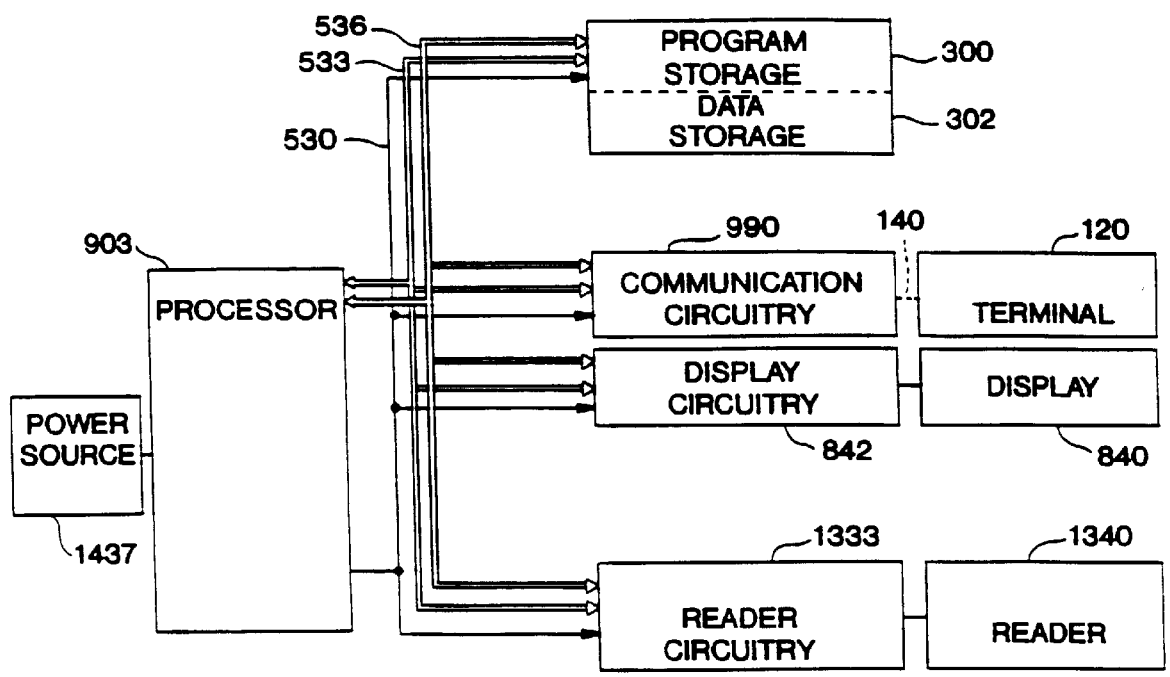
FIG. 1a is general schematic block diagram of an embodiment of an exemplary monetary transactions processing device according to the present invention.

FIG. 1*a* is a general schematic block diagram of a terminal 100 or peripheral 100 of an embodiment of the present invention which includes a monetary transaction reader 1340, monetary transaction reader circuitry 1333, a power source 1437, and optional communication circuitry 990. Although display circuitry is shown in this general embodiment of the invention, display is optional.

In the present embodiment, processing circuitry 903 includes a microprocessor. However, multiple microprocessors, or a plurality of dedicated microprocessors can also be used. Processing circuitry 903 and associated circuitry are powered through a power source 1437. Processing circuitry 903 interfaces with associated circuitry via an address bus 536, data bus 533, and a control bus 530. Specifically, upon detection by the monetary transaction reader 1340 that a monetary transaction is being made, the monetary transaction reader circuitry 1333 interrupts the processing circuitry 903. The circuitry 903 responds to the interrupt by reading the buffered monetary transaction information. Circuitry 903 then immediately records and stores the monetary transaction information in storage 302. The reading and immediate recording of monetary transactions is accomplished for successive or consecutive monetary transactions. In one embodiment, circuitry 903 also adds the new monetary transaction information to a running total of monetary transaction information stored in the storage 302. Terminal 120 or peripheral 120 can also have the same type of configuration as that described for as electronic monetary transactions processing device 100 or peripheral 100 above.

A variety of links and associated circuitry are used in the present invention. By way of example, the link 140 is a serial link and associated circuitry in one embodiment, an RS-232 link and associated circuitry in another embodiment, modem circuitry in communication with the circuitry 990 in yet another embodiment, an RF or infra-red link and associated circuitry, or combination thereof.

A variety of additions, not shown, can be added to the embodiment of the processing circuitry 903 illustrated in FIG. 1*a*. By way of example, a keyboard and associated circuitry, a touch sensitive screen and associated circuitry, an electronic signature line and associated circuitry, a card reader 307 and associated circuitry 309, and combinations thereof can be added.

The terminal or peripheral 120 drives a printer in one embodiment to produce a hard copy of a report representing data or information sent to terminal 120 via the communication circuitry 990 located in an electronic monetary transactions processing device 100 or peripheral 100. In another embodiment, optional service routine, runs on processing circuitry 903 located in electronic monetary transactions processing device 100 or peripheral 100. Processing circuitry 903 communicates successive monetary transaction maker and monetary transaction information to communication circuitry 990 which drives a printer to print out data via a wired link, for example, an RS-232 cable. Similarly, electronic monetary transactions processing device 100 or peripheral 100 can use a serial link to drive a printer directly via communication circuitry 990.

Display circuitry 842 includes a buffer and LED drive circuitry which processing circuitry 903 can write information into in one embodiment. Display circuitry 842 responds to data written into the buffer by displaying that information via a control bus 530.

Reader 1340 (FIG. 1*a*) and associated circuitry 1333 optionally includes a credit card processor, a debit card processor, or a combination thereof.

Moreover, power source 1437 is a battery power source in one embodiment, and can be a portable rechargeable power source in another embodiment. Preferably, the battery is a rechargeable power source, and is located on the electronic monetary transactions processing device 100 or peripheral 100 so as to be easily accessible during replacement or recharging thereof. The power source 1437 can include a hardwired power supply. The present invention also contemplates use of a light responsive energy source such as a photo-cell. In such an embodiment, not shown, the battery life of electronic monetary transactions processing device 100 or peripheral 100 can be enhanced in that energy is obtained from sources of light such as the sun or indoor lighting. The light responsive energy source can be used to supplement the power source 1437. In a variant, software routines on electronic monetary transactions processing device 100 or peripheral 100 assist in conserving electrical energy from power source 1437 by deactivating the circuitry or portions thereof, e.g. the display, of electronic monetary transactions processing device 100 or peripheral 100. Circuitry of electronic monetary transactions processing device 100 or peripheral 100 is reactivated once there is card information detected by reader 307 and associated circuitry, or combination thereof. In yet a further variant, a back-up power source is provided to power source 1437. In yet a further variant, monetary transaction transaction data is semi-permanently stored for future off-loading in data storage 302 in the event there is a loss of power from power source 1437.

In an embodiment, a plurality of successive monetary transaction data sets, comprising card information from an information bearing card and associated numerical monetary transaction amount information, are immediately recorded on terminal 100 or peripheral 100 and grouped together. The grouped information is then transmitted to a card account processor. The card account processor authorizes a sub-group of monetary transaction data for further processing. The authorized and unauthorized monetary transaction data sets can be transmitted to a electronic monetary transactions processing device 100 or peripheral 100, terminal or peripheral 120, a recipient's database, or combination thereof, for exclusion of the unauthorized monetary transaction data sets. The unauthorized monetary transaction data sets can be deleted if desired at a card account processor. The unauthorized monetary transaction data sets are excluded from the group, and the authorized monetary transaction data, e.g. card information and monetary transaction amount information, are re-transmitted to the card account processor. Means responsive to information sent via a transferring means enters a debit representative of the monetary transaction amount information to an account of the monetary transaction maker. Means responsive to information sent via the transferring means enters a credit representative of the monetary transaction amount information to an account of a recipient of the monetary transaction. The monetary transaction data set is further processed and a record of the monetary transaction for substantiating a monetary transaction is forwarded to a user or, recipient.

In another variant, a routine on terminal 100 or peripheral 100, immediately records information read from information bearing cards correlated to numerical monetary transaction amounts for successive monetary transactions made by a plurality of successive users without need for input of other information. The correlation of the numerical amount is made automatically with successive user information bearing card information in one variant. In anther variant there is a correlation of variable monetary transaction numerical amounts with successive monetary transaction maker card information, and optionally a pre-programmed fixed numerical monetary transaction amount of an order inducing the making of a monetary transaction with successive monetary transaction maker card information.

Where a keyboard is used, keyboard circuitry scans keyboard to determine if a key has been activated. Keyboard refers to both a keypad and entry key, or combination thereof. Key board might include a cancel key, and keys with other alpha-numeric text. The keyboard can have a key that represents a specific denomination amount, e.g. five dollars ($5) or ten dollars ($10). Processing circuitry 903 interfaces with keyboard 107 and associated circuitry 109 via an address bus 536, data bus 533, and control bus 530. Once a key has been activated on the keyboard 107, that key information is moved into a buffer and interrupts the processing circuitry 903 to communicate that the key is ready. Circuitry 903 responds to the interrupt by reading the buffered keyboard information. Circuitry 903 then stores the keyboard information in a storage 302 if necessary. The keyboard information can consist of a monetary transaction amount, an account number of a monetary transaction maker, an authorization code, and the like. Key board inputs of successive monetary transactions are made on terminal 100 or peripheral 100.

Electronic monetary transactions management peripheral 100 does not include a card processor. Rather, it is appreciated that electronic monetary transactions management peripheral is lighter in weight and less costly to manufacture than electronic monetary transactions processing device 100 due to decreased circuitry contained therein. In one variant, it is further appreciated that peripheral 100 consists essentially of a card reader 307, data storage 302, a program storage, circuitry 903, a communication port for off-loading information from the peripheral, a self-contained source of electrical power; and, a software routine for immediately recording, capturing, and/or seizing successive inputs of monetary transaction maker card information, a software routine for immediately recording, capturing, and/or seizing successive inputs of monetary transaction maker card information correlated to a pre-programmed monetary transaction numerical amount, a software routine for immediately recording, capturing, and/or seizing, successive inputs of monetary transaction maker card information correlated to variable monetary transaction numerical amount information, or combination thereof. Optionally, a display and keys are added thereto.

A card processor 160/240 includes a card slot. A monetary transaction maker swipes, enters, or passes a credit card 145 through the card slot or port of a credit card processor 160. Alternatively, a monetary transaction maker swipes, enters, or inserts a debit card 150 through a card slot of a debit card processor 240.

In a preferred embodiment, electronic monetary transactions processing device 100 has both a credit card processor 160 and a debit card processor 240 utilizing a single processor that discriminates between the type of monetary transaction made. An exemplary credit and debit card processor 160/240 is disclosed in U.S. Pat. No. 5,012,077.

Successive credit card monetary transactions made on terminal 100 or peripheral 100 do not require an authorization, or verification of authorization by signature or numeric code. This is due to the unique nature of a monetary transaction in a setting where one knows the user or has a long term relationship with a user. If a monetary transaction does not ultimately get consummated, the recipient of the monetary transaction has a decreased risk of loss. Consequently, the present invention contemplates that successive users will simply need to swipe or insert their respective information bearing cards 145/150 through, or into, the electronic monetary transactions processing device 100 or peripheral 100, as required, and enter the amount of their monetary transactions by pressing keys associated with a cash denomination on the key pad 890. The first monetary transaction maker passes electronic monetary transactions processing device 100 or peripheral 100 to a subsequent monetary transaction maker who repeats the monetary transaction step by depressing a key as to the amount given by him. The same steps are optionally performed by a plurality of monetary transaction makers each choosing his or her monetary amount to be given. The card information and monetary transaction information is then post processed. Post processing includes transmitting the card information and monetary transaction information to a card account processor to request a verification or authorization, for crediting and debiting of the appropriate accounts, or combination thereof. The present invention contemplates that a monetary transaction maker will have pre-authorized the recipient organization to collect a monetary transaction amount. Pre-authorization can include an agreement with the organization that a monetary transaction maker authorizes the monetary transaction of a given amount once a certain action takes place, i.e. the monetary transaction maker swipes card 145/150 through electronic monetary transactions processing device 100 or peripheral 100. The pre-authorized monetary transaction amount and the users' card information are correlated, and forwarded to a card account processor for post-processing.

By way of further example, a monetary transaction maker 1 enters into an arrangement with a recipient. The arrangement is that the recipient will associate a preferred monetary transaction amount with the user's card information each time the monetary transaction maker enters his respective card information into electronic monetary transactions processing device 100 or peripheral 100. It will be appreciated that this method allows for monetary transaction maker 1 to simply enter his card information in the terminal to make a monetary transaction. Less time is spent by the monetary transaction maker 1 focusing on the financial aspects of the transaction. That is, there is an automatic correlation with a predesignated monetary transaction numerical amount with a respective card information on entered on terminal 100 or peripheral 100.

In the case of a debit card 150 monetary transaction via a electronic monetary transactions processing device 100 or peripheral 100, the monetary transaction maker can authorize the recipient to use a secret identification number associated with his debit card account in order to allow the organization to automatically obtain the monetary transaction without seeking subsequent authorization from the monetary transaction maker. Alternatively, the monetary transaction maker may enter his personal identification number (PIN) into electronic monetary transactions processing device 100 or peripheral 100, terminal 120, or combination thereof, and electronic monetary transactions processing device 100 or peripheral 100, 120, or combination thereof, stores the PIN in an encrypted form for later processing. In this scenario, the monetary transaction maker need only perform the action of swiping or inserting, as required, card 150 through processor 160/240 on electronic monetary transactions processing device 100 or peripheral 100 to make a monetary transaction. The secret identification number is associated or correlated with the card information, monetary transaction amount information, or combination thereof, and forwarded to a card account processor for post processing. In this scenario post processing includes obtaining appropriate authorizations, and crediting and debiting the monetary transaction maker's account and recipient's account, or combination thereof, as required.

The present invention also makes provision that a monetary transaction maker need not disclose a user's card 145/150 account authorization code to the recipient for security reasons but still may wish to make a card 145/150 monetary transaction. In this case, the present invention contemplates that the recipient's terminal 120 or peripheral 120, electronic monetary transactions processing device 100 or peripheral 100, or combination thereof, has an input 307 that allows for entry of the user's card 145/150 account authorization code so that it is encrypted and only decipherable and usable by the recipient's terminal 120 or peripheral 120, electronic monetary transactions processing device 100 or peripheral 100, a card account processor, or combination thereof, for processing the card 145/150 monetary transaction. An advantage of this feature is added security for the monetary transaction maker. The present invention also contemplates using a touch sensitive screen, not shown, to input, a monetary transaction maker's name, credit card and/or debit account information, and the like.

A plurality of successive associated card 145, 150 monetary transactions are immediately recorded and stored in data storage 302. A set of software routines associates or correlates successive users' card account information with respective monetary transaction amounts. The monetary transaction maker has made a number of card monetary transactions within a specified time period which are immediately recorded, stored and tallied by a set of software routines.

The electronic monetary transactions processing device 100 or peripheral 100 can adopt pen-based input or touch sensitive screen input. A pen and screen provide a monetary transaction maker a substitute for key pad 890. By way of example, a monetary transaction maker may use a pen to write in the amount of monetary transaction or other alphanumeric text on a screen, not shown. Alternatively, a symbolic key associated with a cash denomination might appear on a screen. The monetary transaction maker then uses a finger to touch the symbolic key associated with a cash denomination and designates the monetary transaction amount. If a user's signature is required, a pen can also be used with a screen as an electronic signature line. The user's signature entered on a screen can be collected, stored, and/or transmitted by card processor 160/240 along with monetary transaction information to a third party card processor via a communication link 1030. Alternatively, this information might be sent to recipient's terminal 120 or peripheral 120 via a communication link 140 for further processing, storage, and/or transmittal via communication link 1030.

Terminal 100 or peripheral 100 immediately records successive monetary transactions made thereon. Further, in one embodiment, data storage 302 stores in the range of 10 to 1000+monetary transactions, including card information and associated monetary transaction information, the particular storage requirements being dictated by the number of monetary transaction makers expected to use electronic monetary transactions processing device 100 or peripheral 100. Preferably, data storage can store approximately 200 transactions.

The present invention also contemplates that in other embodiments swiping a credit card 145 or debit card 150 might not be required. As used herein, the term "swiping" or "passing" refers to any method for communicating information on an information bearing card to a card reader 307. The invention has the features enumerated above in FIG. 1, with the addition of a receipt generator 820 at electronic monetary transactions processing device 100 or peripheral 100. By way of example as with programmable IC cards. A user can pre-program his or her information bearing card to off-load a pre-determined monetary transaction from his or her respective card onto terminal 100 or peripheral 100. Again, it is understood that the making of monetary transactions by a plurality of successive users is greatly accelerated where IC cards are used. Here the successive users simply insert the IC card into a communication port on terminal 100 or peripheral 100. The IC card off-loads a monetary transaction from itself onto the terminal 100 or peripheral 100. The terminal 100 or peripheral 100 immediately records the off-loaded monetary transactions from a plurality of successive users. There is no need for the entry of a monetary transaction numerical amount onto terminal 100 or peripheral 100 as the IC card has been pre-programmed with a numerical monetary transaction amount.

In yet a further variant the IC card is pre-programmed to recognize terminal 100 or peripheral 100. Hence, IC card recognizes terminal 100 or peripheral 100, and then automatically off-loads a pre-programmed monetary transaction from the IC card onto terminal 100 or peripheral 100. The present invention also provides an improved IC (Integrated circuit or smart) card in which an improvement comprises a pre-programmed monetary transaction thereon.

A monetary transaction maker may wish to obtain a receipt 830 directly after he has made a monetary transaction. After entering his monetary transaction, a cash monetary transaction 143, display 840 displays a message asking the monetary transaction maker if he wishes a receipt for his monetary transaction. The monetary transaction maker presses a key representing yes on keypad 890. Receipt generator 820 prints receipt 830 for the monetary transaction maker. The receipt contains information stored initially in the electronic monetary transactions processing device 100 or peripheral 100, e.g. the user's name, the amount of the monetary transaction, and/or the date of the monetary transaction. Preferably, the generation of the receipt(s) is made remote from terminal 100 or peripheral 100 so as not to decelerate the making of sequential monetary transactions on terminal 100 or peripheral 100.

Monetary transactions processing device 100 or peripheral 100 is used to induce, facilitate, and solicit successive monetary transactions made by a plurality of users. The monetary transaction is made by an information bearing card, e.g. such as a credit card 145, or debit card 150. A method comprises the steps of prompting a cardholder monetary transaction maker to pass his information bearing card, e.g. through a card reader 307; prompting a monetary transaction maker to manually enter information representative of a monetary transaction amount; and, optionally prompting the monetary transaction maker to verify information representative of a monetary transaction amount. Verification may include a prompt to press a key representative of a "YES," "NO," "ENTER," or other type of key(s). Prompting is accomplished by visually displaying an alpha-numeric message on display 840. Optionally prompting may be accomplished by providing alpha-numeric text disposed on electronic monetary transactions processing device 100 or peripheral 100, or combination thereof. Further optional visual prompts may include a prompt appearing on a display 840 requesting additional identification information of a monetary transaction maker, e.g. the address of an monetary transaction maker, a prompt requesting a special intention, or combination thereof.

Figure 3:
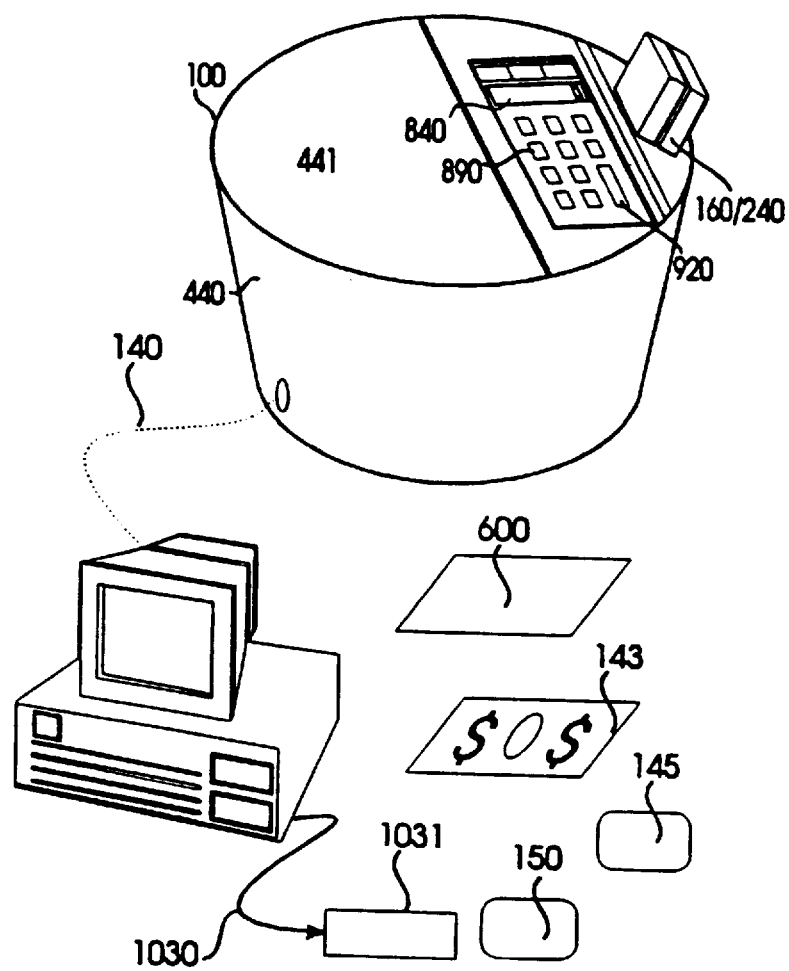
FIG. 3 is a perspective view of a hand held portable monetary transactions processing terminal or peripheral according to the invention.

FIG. 3 is a perspective view of a portable electronic monetary transactions processing device 100 or peripheral 100, a docking station 1999 for portable electronic monetary transactions processing device 100 or peripheral 100, and a container 440 for gathering cash and envelope monetary transactions.

Docking station 1999 allows for a electronic monetary transactions processing device 100 or peripheral 100 to be docked or received therein. Electronic monetary transactions processing device 100 or peripheral 100 is disposed in the docking station 1999 to allow information from an information bearing card and/or monetary transaction amount information to be transmitted via docking station 1999 to, by way of example, terminal 120 (via communication link 140), to a card account processor 1031 directly via communication link 140 (FIG. 4), to another electronic monetary transactions processing device 100 or peripheral 100, or a combination thereof.

FIG. 5 illustrates a method of obtaining monetary transactions. The method simplifies the way a monetary transaction obtained. A portable hand held electronic monetary transactions processing device 100 or peripheral 100 is provided for receiving and immediately recording a monetary transaction given. The monetary transaction is made by use of card information from an information bearing card 145/150. As described above, information bearing card 145/150 is a credit card 145, debit card 150, or combination thereof.

A first monetary transaction maker 1 is handed a portable electronic monetary transactions processing device 100 or peripheral 100 for making of record data sets of a monetary transaction. The monetary transaction is made the monetary transaction maker using an information bearing card such as a credit card 145, debit card 150, or combination thereof. Preferably electronic monetary transactions processing device 100 or peripheral 100 has its own source of electric power 1437 and a plurality of optional keys (as described above) manually operable for entering the amount of the monetary monetary transaction to be given, designate a cause, etc. In a preferred embodiment, electronic monetary transactions processing device 100 or peripheral 100 has a case dimensioned for being held in the palm of monetary transaction maker 1's hand 1R. The electronic monetary transactions processing device 100 or peripheral 100 has a reader 307 disposed on electronic monetary transactions processing device 100 or peripheral 100 for reading a card record medium, e.g. an information bearing card. The card record medium has indicia identifying a monetary transaction maker 1 making a given monetary monetary transaction. The terminal has means for making a visual display 840 of the amount entered by manual operation of entry keys. Electronic monetary transactions processing device 100 or peripheral 100 also has means for recording the amount of the monetary transaction, e.g. data storage 302, including means for storing the amount of the monetary transaction correlated to the indicia read on the record medium, e.g. information bearing card, of the corresponding monetary transaction maker 1. The correlated amount and indicia read by reader 307 are for eventual off-loading from the electronic monetary transactions processing device 100 or peripheral 100. A plurality of terminals 100 or peripherals 100 are circulated, or dispersed among a group of prospective users.

Monetary transaction maker 1 is handed a electronic monetary transactions processing device 100 or peripheral 100 of the plurality of terminals 100, peripherals 100, or combination thereof. By way of example, monetary transaction maker 1 is provided electronic monetary transactions processing device 100 or peripheral 100 by a card account processor, a bank, a manufacturer, third party account processor, or a combination thereof. The monetary transaction maker 1 holds the electronic monetary transactions processing device 100 or peripheral 100 in hand 1R. Monetary transaction maker 1 enters is card information by way of card reader 307 disposed on electronic monetary transactions processing device 100 or peripheral 100. The monetary transaction maker 1 takes his information bearing card, e.g. a credit card 145, debit card 150 or combination thereof, with his fingers on hand 1L, and passes it through card reader 307 disposed on electronic monetary transactions processing device 100 or peripheral 100. The reader 307 reads information on monetary transaction maker 1's information bearing card and stores it in a data storage. Monetary transaction maker 1 then uses his fingers on hand 1L and enters a monetary transaction amount, a designation for a particular cause the monetary transaction is for, or combination thereof. The monetary transaction maker 1 can press a single key disposed on electronic monetary transactions processing device 100 or peripheral 100, e.g. a $5 key, to enter a monetary transaction monetary amount. The monetary transaction maker 1 can press a combination of keys on a keyboard disposed on the electronic monetary transactions processing device 100 or peripheral 100 to designate a monetary transaction amount, e.g. $35.71. Monetary transaction maker 1's monetary transaction amount and respective card information are immediately correlated, and immediately stored in a data storage on electronic monetary transactions processing device 100 or peripheral 100. Monetary transaction maker 1 can enter card information with a single information bearing card or with multiple information bearing cards.

Monetary transaction maker 1 then passes the electronic monetary transactions processing device 100 or peripheral 100, as indicated by phantom line 11, to second monetary transaction maker 2. The second monetary transaction maker 2 receives electronic monetary transactions processing device 100 or peripheral 100 from monetary transaction maker 1 in his hand 2R. Monetary transaction maker 2 enters his respective card information by way of card reader 307 disposed on the electronic monetary transactions processing device 100 or peripheral 100.

The monetary transaction maker 2 takes his information bearing card, e.g. a credit card 145, debit card 150 or combination thereof, with his hand 2L, and passes it through card reader 307 disposed on electronic monetary transactions processing device 100 or peripheral 100. The card reader 307 reads information on monetary transaction maker 2's respective information bearing card, immediately records the information, and stores it in a data storage. Monetary transaction maker 2 then uses his hand 2L and enters a monetary transaction amount, a designation for a particular cause the monetary transaction is for, or combination thereof. The monetary transaction maker 2 can press a single key disposed on electronic monetary transactions processing device 100 or peripheral 100, e.g. a $10 key, to enter a monetary transaction amount (FIG. 1). Optionally, monetary transaction maker 2 can press a combination of keys on a keyboard disposed on electronic monetary transactions processing device 100 or peripheral 100 to designate a monetary transaction amount, e.g. $77.73. Monetary transaction maker 2's monetary transaction amount and respective card information are correlated, immediately recorded, and stored in a data storage on electronic monetary transactions processing device 100 or peripheral 100.

The process is repeated for each respective subsequent monetary transaction maker. For example, monetary transaction maker 2 passes electronic monetary transactions processing device 100 or peripheral 100, as indicated by phantom line 1N, to monetary transaction maker N. Monetary transaction maker N receives electronic monetary transactions processing device 100 or peripheral 100 from monetary transaction maker 2 in his hand NR. Monetary transaction maker N enters his respective card information by way of card reader 307 disposed on electronic monetary transactions processing device 100 or peripheral 100.

Monetary transaction maker N takes his respective information bearing card, e.g. a credit card 145, debit card 150 or combination thereof, with his fingers on hand NL, and passes it through card reader 307 disposed on electronic monetary transactions processing device 100 or peripheral 100. The reader 307 reads information on monetary transaction maker N's respective information bearing card, immediately records the information, and stores it in a data storage. Monetary transaction maker N then uses his hand NL and enters a monetary transaction amount, a designation for a particular cause the monetary transaction is for, or combination thereof. The monetary transaction maker N may press a single key disposed on electronic monetary transactions processing device 100 or peripheral 100, e.g. a $50 key, to enter a monetary transaction amount. Optionally, monetary transaction maker N may press a combination of keys on a keyboard disposed on electronic monetary transactions processing device 100 or peripheral 100 to designate a monetary transaction amount, e.g. $99.73. Monetary transaction maker N's monetary transaction amount and respective card information are correlated, immediately recorded, and stored in a data storage on electronic monetary transactions processing device 100 or peripheral 100.

For example, several hundred monetary transaction transactions ("L" monetary transaction transactions) can be made sequentially in the manner on a first electronic monetary transactions processing device 100 or peripheral $100_1$. A plurality of terminals 100, e.g. electronic monetary transactions processing device 100 or peripheral $100_1$ . . . through electronic monetary transactions processing device 100 or peripheral $100_Z$ are circulated or dispersed among a group of users. Each respective electronic monetary transactions processing device 100 or peripheral 100 can collect "L" monetary transactions. The result is that "L" monetary transactions times "Z," the number of electronic monetary transactions processing devices 100 and/or peripherals 100, gives (Q) total monetary transactions received. $L*Z=Q$. In one variant of the invention, it will be understood that (Q), e.g. tens of hundreds of monetary transactions, have been received before interposing a request for verification or authorization, authorization step, verification step, or a combination thereof, between two respective monetary transactions within the group of monetary transactions (Q) during a monetary transaction session.

In the scenario where monetary transaction maker 1 has made monetary transaction maker 1's respective monetary transaction amount of $5.00, and his respective card information with immediate recordation thereof; where monetary transaction maker 2 has made his respective monetary transaction amount of $10.00 and his respective card information with immediate recordation thereof; and, where monetary transaction maker 3 has made his respective monetary transaction amount of $50.00 and his respective monetary transaction amount with immediate recordation thereof; and, monetary transaction maker N has made his respective monetary transaction amount of $100.00 and his respective card information with immediate recordation thereof, data storage in electronic monetary transactions processing device 100 or peripheral 100 stores the following:

Monetary transaction maker 1's card information $5.00

Monetary transaction maker 2's card information $10.00

Monetary transaction maker 3's card information $50.00

Monetary transaction maker N's card information $100.00

Subsequently, electronic monetary transactions processing device 100 or peripheral 100 transmits, communicates or off-loads in batch:

Monetary transaction maker 1's card information and associated $5.00

Monetary transaction maker 2's card information and associated $10.00

Monetary transaction maker 3's card information and associated $50.00

Monetary transaction maker N's card information and associated $100.00 to recipient's terminal or peripheral 120 via docking station 1999. That is a communication link is established between electronic monetary transactions processing device 100 or peripheral 100 and remote terminal 120 for the transmission or communication of the information above. Terminal 120 receives, and immediately stores the information:

Monetary transaction maker 1's card information and associated $5.00

Monetary transaction maker 2's card information and associated $10.00

Monetary transaction maker 3's card information and associated $50.00

Monetary transaction maker N's card information and associated $100.00

Terminal 120 then communicates and/or transmits the information, including optional correlated information identifying an account of a monetary transaction processing organization, or combination thereof, via communication link 1030, by way of example a telephone line, to card account processor 1031 or a funds processing network.

Optionally, an authorization is obtained at card account processor 1031 for each monetary transaction transaction at terminal 120 or peripheral 120. By way of example, information designating each monetary transaction transaction as authorized or unauthorized may be added to each respective monetary transaction:

Monetary transaction maker 1's card information and associated $5.00—unauthorized Monetary transaction maker 2's card information and associated $10.00—authorized Monetary transaction maker 3's card information and associated $50.00—authorized Monetary transaction maker N's card information and associated $100.00—authorized The authorized monetary transactions are then processed further. Processing includes debiting or charging, as appropriate, an account of a monetary transaction maker for the amount of the authorized monetary transaction. By way of example, Monetary transaction maker 2's account is debited $10.00;

Monetary transaction maker 3's account has a charge added to it of $50.00; and, Monetary transaction maker N's account has a debit entered to it of $100.00.

An account of a recipient is augmented the amount of the authorized monetary transactions. By way of example, recipient's account 1033 would be augmented for the $10.00 received from monetary transaction maker 2, for the $50.00 received from monetary transaction maker 3, and for the $100.00 received from monetary transaction maker N.

Monetary transaction maker 1's monetary transaction was unauthorized. As an unauthorized monetary transaction it may be reported to the monetary transaction processing organization or recipient of the monetary transaction. The recipient may choose to follow up with monetary transaction maker 1 to determine if the monetary transaction maker would like to make a subsequent monetary transaction. Optionally, monetary transaction maker 1's card information and respective monetary transaction amount of $5.00 may be discarded. Users are free to leave terminals 100 and peripherals 100 upon recordation of monetary transactions thereon.

Optionally, as each monetary transaction maker, e.g. 1, 2, . . . N, enters his respective card information and respective monetary transaction amount on electronic monetary transactions processing device 100 or peripheral 100, the monetary transactions are immediately and successively recorded thereon, electronic monetary transactions processing device 100 or peripheral 100 transmits or communicates each respective card information and respective monetary transaction amount for each successive monetary transaction maker to terminal 120, which is remote from electronic monetary transactions processing device 100 or peripheral 100. Terminal 120 then stores a back-up copy of data sets of each monetary transaction, e.g. respective monetary transaction maker monetary transaction amount information and card information in a data storage. Optionally, each respective user's card information and numerical information of a monetary transaction amount is temporarily stored in terminal 120 in a group for eventual transmission thereof to a card account processor 1031 via communication link 1030.

Optionally, electronic monetary transactions processing device 100 or peripheral 100 transmits card information and amount information after a certain minimum threshold value has been reached. By way of example, electronic monetary transactions processing device 100 or peripheral 100 transmits this information after a threshold monetary transaction level of, for example, $500.00 or $1000.00 has been reached. Optionally, every time a threshold amount has been reached a transmission via a communication link to a recipient's terminal or peripheral 120, card account processor 1030, a bank, or combination thereof is made. As described previously, a communication link can include a mobile telephone cellular link, a communication link incorporating pager technology, a communication link to a satellite, and the like.

In yet a further embodiment, a group of monetary transactions are forwarded from electronic monetary transactions processing device 100 or peripheral 100 to terminal 120, terminal 120 makes a copy of the monetary transactions and then automatically initiates upon activation thereof of a downloading procedure to card account processor 1030, a bank, a fund processing network, or combination thereof.

It is appreciated that this back-up feature will decrease the risk of loss of card information and monetary transaction amount information in the event that electronic monetary transactions processing device 100 or peripheral 100 is accidentally damaged or malfunctions.

By way of example, in the scenario where monetary transaction maker 1 has entered his respective monetary transaction, electronic monetary transactions processing device 100 or peripheral 100 transmits monetary transaction maker 1's respective monetary transaction transaction to terminal 120 (which is remote from the vicinity of where terminals 100 are used with group of makers in this example) via a wireless communication link 140. Terminal 100 or peripheral 100 optionally immediately records the monetary transaction thereon. Terminal 120 immediately records and stores monetary transaction maker 1's monetary transaction in a data storage for eventual transmission to card account processor 1031. Electronic monetary transactions processing device 100 or peripheral 100 retains a record of monetary transaction maker 1's monetary transaction. Terminal 120 retains a copy of monetary transaction maker 1's monetary transaction. It is understood that having two copies of the monetary transaction, e.g. one copy retained on terminal 100 and peripheral 100 and one copy on terminal 120 or peripheral 120, decreases the risk of loss the monetary transaction. This feature is especially preferred where a multiplicity of successive monetary transactions are made on the terminal 100 or peripheral 100. There is a significant decrease in the risk of loss of the multiplicity of information where one or more record copies are made by the methods and devices described herein.

Optionally, the copy of users' data sets comprised of monetary transactions immediately recorded in electronic monetary transactions processing device 100 or peripheral 100's data storage are optionally compared to the copy of data sets comprised of monetary transactions in terminal 120's data storage. Comparison is made to determine if there has been a corruption of data sets on either peripheral 100 or terminal 100, or on terminal 120 or peripheral 120.

Monetary transaction maker 2 enters his monetary transaction. The data sets comprised of the monetary transaction are immediately recorded on terminal 100 or peripheral 100. Electronic monetary transactions processing device 100 or peripheral 100 transmits monetary transaction maker 2's respective data sets comprised of a monetary transaction to terminal 120 (which is remote in this example) via a wireless communication link 140. Terminal 120 immediately records and stores monetary transaction maker 2's data sets comprised of a monetary transaction in a data storage for eventual transmission to card account processor 1031. Electronic monetary transactions processing device 100 or peripheral 100 retains a record of monetary transaction maker 2's data sets comprised of a monetary transaction. Terminal 120 retains a copy of monetary transaction maker 2's data sets comprised of the monetary transaction. Optionally, the copy of monetary transaction maker 1's data sets comprised of the monetary transaction in electronic monetary transactions processing device 100 or peripheral 100's data storage is compared to the copy in terminal 120's data storage. Optionally, monetary transaction maker 1's and monetary transaction maker 2's monetary transaction data sets are grouped together for eventual transmission to card account processor 1031.

If the electronic monetary transactions processing device 100 or peripheral 100 is accidentally damaged as it makes its way to monetary transaction maker N so that it is no longer operational and so that it has lost the monetary transaction data sets in data storage 302. It will be appreciated that since a "copy" of the monetary transaction data sets of user's 1 and 2 are retained in terminal 120, these monetary transaction data sets can still be submitted to card account processor 1031 for processing, whereas lack of this back up feature would have resulted in the loss of the monetary transaction data sets made by user's 1 and 2. It will be understood that this feature will provide a great deal of security in the event there are thousands of dollars of monetary transaction data sets received by electronic monetary transactions processing device 100 or peripheral 100 and electronic monetary transactions processing device 100 or peripheral 100 is lost, damaged, or stolen.

A method of reducing the risk associated with the damage to data storage of a portable electronic monetary transactions processing device 100 or peripheral 100, the loss, or theft of electronic monetary transactions processing device 100 or peripheral 100, and the loss of data sets comprised of successive monetary transactions immediately recorded on terminal 100 or peripheral 100, is also provided. A monetary transaction maker 1 enters his monetary transaction data sets into portable a electronic monetary transactions processing device 100 or peripheral 100 for immediate recordation thereof or optionally for immediate real time communication thereof to a remote terminal 120 or peripheral 120. A record of the monetary transaction is retained in electronic monetary transactions processing device 100 or peripheral 100. A single monetary transaction transaction, or a preferably a plurality of successive made monetary transactions, are transmitted or communicated to terminal 120 via communication link 140, preferably a wireless communication link. Terminal 120 stores a "copy" of the single monetary transaction data sets, or a "copy" of a plurality of the successively made monetary transaction data sets in a data storage. Eventually, terminal 120 transmits a single monetary transaction data sets or a group of monetary transaction data sets to a card account processor 1031 for processing.

In another variant of peripheral 100, self-powered peripheral 100 consists essentially of card reader 307; optional program storage having routines for reading information from successive users' information bearing cards, and routines for immediately communicating the information read from successive users' record bearing cards to a remote terminal or peripheral, e.g. terminal 120 and peripheral 120, and communication circuitry. In this variant, operation of peripheral 100 is as follows: a monetary transaction maker 1 enters monetaary transaction data sets or data sets comprised of information identifying the monetary transaction maker on peripheral 100. The information is automatically read by reader 307. Peripheral 100 immediately communicates monetary transaction maker 1 monetary transaction data sets or data sets comprised of information identifying the monetary transaction maker to a remote terminal 120 or peripheral 120. Terminal 120 or peripheral 120 immediately records the data sets or data sets comprised of information identifying the monetary transaction maker thereon for eventual off-loading thereof. It is appreciated that a plurality of successive data sets made by successive users are immediately communicated from peripheral 100 to remote terminal of peripheral 120 as they are made on peripheral 100. It is further appreciated that the data sets are optionally encrypted for transmission from peripheral 100 to peripheral 120, and that there is no risk of loss of data sets if peripheral 100 is damaged since immediate recordation of respective data sets is accomplished at remote peripheral 120 or terminal 120.

Optionally, the original single monetary transaction data set, or plurality of successively made monetary transaction data sets, are transmitted to terminal 120 from electronic monetary transactions processing device 100 or peripheral 100 and no record copy of the transaction is retained in electronic monetary transactions processing device 100 or peripheral 100 data storage. It will be understood that the transmission of monetary transaction data to remote terminal 120 from electronic monetary transactions processing device 100 or peripheral 100, as electronic monetary transactions processing device 100 or peripheral 100 is being used in the field for gathering of monetary transactions, allows for memory 302 to be cleared and freed up for additional monetary transaction transactions to be made on electronic monetary transactions processing device 100 or peripheral 100. This method allows for electronic monetary transactions processing device 100 or peripheral 100 to gather a multiplicity of monetary transaction data sets with limited memory and allows for a terminal to be manufactured with limited memory requirements. The peripheral 120 or terminal 120 also optionally transmits a data set to peripheral 100 to notify a monetary transaction maker that communication of data sets therebetween is being executed properly.

It will be understood that identical or substantially identical records of monetary transaction data sets are immediately recorded and stored in both electronic monetary transactions processing device 100 or peripheral 100 and the remote terminal. In a variant, the monetary transaction data sets downloaded after the termination of the monetary transaction session is compared to the record copy of the monetary transaction transaction data that was sequentially transmitted for storage to the remote terminal for accuracy.

The method also is used for substantiating a monetary transaction tax deduction. The monetary transaction is made by way of an information bearing card including self-authenticating, and self-authorizing record bearing cards. It is understood that the method described herein provides for ubiquitous monetary transaction making and substantiation. Ubiquitous monetary transaction making and substantiation involves the making of a monetary transaction anywhere, or anyplace there is a terminal 100 or peripheral 100 provided, and being provided a record that consolidates the monetary transactions made at different remote locations ubiquitously, and to disparate recipients.

A record of a monetary transaction data sets or a group of data sets is routed to a mailing service 1037, e.g. the U.S.

Post Office, a private mail courier, or the like. The mailing service 1037 delivers the record of the monetary transaction to a mailing address of monetary transaction maker 1039. The record of the monetary transaction is used by the monetary transaction maker to substantiate the monetary transaction made to the recipient. Substantiation may be made to a national, state, or local taxing body, e.g. the Internal Revenue Service. It will be understood that the costs associated with and the speed of providing substantiation for deductions, and the like, for a plurality of cardholders who are monetary transaction makers will be reduced by utilization of the above method.

In an alternate method, the method comprises the step of forwarding a record of the monetary transaction to monetary transaction maker N by electronically mailing, e.g. e-mailing, a record of the monetary transaction to monetary transaction maker N using a communication link, e.g. phone lines. By way of example, a periodic statement regarding monetary transactions is sent to a monetary transaction maker via a network of computers, e.g. Prodigy, America On line, and the like, to a user's home computer terminal 3390 via a communication link, e.g. a telephone hook up. As illustrated in FIG. 4, communication links are provided between a plurality of electronic monetary processing devices 100 or peripherals 100 and the network of computers 3397, 3390, and 3395.

The record of the monetary transaction is forwarded by a bank 1043, a card account processor 1031, by way of example, Card establishment Services of Melville, New York, N.Y., or VISA Merchant Bank Services of San Mateo Calif., MasterCard, an issuing bank, a processing bank, a merchant bank, recipient of a monetary transaction, or combination thereof to monetary transaction maker N. It is understood that a plurality of ubiquitously made monetary transactions made by a plurality of different users is processed, acknowledged at a great speed and in a minimal amount of time.

In yet another embodiment of the method, a record of the monetary transaction, or a plurality of monetary transactions made by a monetary transaction maker, are electronically forwarded, mailed, or combination thereof, to a governmental tax processing body, e.g. the Internal Revenue Service. It will be appreciated that the method disclosed herein has a number of benefits, including the reduction of the work and resources associated with preparing tax returns and claiming monetary transaction tax deductions, reducing the amount of fraud associated with claiming monetary transaction deductions, reducing the amount of work a governmental tax processing authority has to do when processing monetary transaction deductions.

The method provided above can also include the step of associating with monetary transaction data with a tax identification number of a monetary transaction maker, e.g. a social security number of a monetary transaction maker and the like, a tax return for a monetary transaction maker, or a combination thereof. It will be appreciated that the association of the tax identification number associated with a monetary transaction maker, a tax return of a monetary transaction maker, and a monetary transaction or plurality of monetary transaction for a monetary transaction maker, and the direct forwarding of the monetary transaction information to a tax processing governmental body will greatly simplify the processing of charitable monetary transaction deductions and the like.

The present invention further contemplates forwarding a record of monetary transactions to a monetary transaction maker, a card account processor 1031, a bank, or combination thereof. As will be appreciated utilization of this method provides the benefits of streamlining the process for organizations involved with substantiating monetary transactions made by users.

A method of decreasing the average number of charge backs associated with a group of transactions is also provided. The transactions are made on an off-line electronic monetary transactions processing device 100 or peripheral 100 that accepts transactions by use of information bearing card. The method includes the steps of gathering a plurality of monetary transactions into a batch through the use of an off-line information bearing card terminal. The monetary transaction comprises information from an information bearing card for a respective monetary transaction maker and designated monetary transaction amount information for a respective monetary transaction maker. The monetary transaction data are transmitted in batch for authorization to a card account processor. Unauthorized transactions are discarded and authorized transactions are settled or reconciled.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A method of monetary transaction processing, comprising the steps of entering and recording on a portable, self-powered, monetary transaction processing device a plurality of monetary commitments data consisting of a numerical amount and indicia read from an information bearing card, and batch off-loading of said data from said portable, self-powered, monetary transaction processing device to a second device whereby recordation of each monetary transaction is uninterrupted by verification of validation and/or authorization.

2. The method according to claim 1 further comprising the step of acknowledging the monetary transactions from a remote data processing location device from where the monetary transactions were entered, in which there is no verification of validation and/or authorization at said portable, self-powered, monetary transaction processing device.

3. The method according to claim 1 further comprising the step of entering credits to accounts for the monetary transactions to recipients of the monetary transactions, and entering debits to accounts for the monetary transactions to makers of the monetary transactions.

4. The method of claim 1 in which said information bearing card is a smart card.

5. The method of claim 1 further comprising preprograming said information bearing card to recognize said portable, self-powered, monetary transaction device.

6. The method of claim 1 further comprising communicatively linking said monetary transaction processing device to said second device via a docking station.

7. The method of claim 1 further comprising communicatively linking said portable, self-powered, monetary transaction processing device, or optionally said second device, to a card account processor, and transferring said monetary commitments data to said card account processor.

8. The method of claim 1 further comprising electronically mailing acknowledgement data of said monetary transaction to a user's personal computer.

9. The method of claim 1 further comprising encrypting said monetary transaction data.

10. The method of claim 1 further comprising entering a code associated with said information bearing card on said portable, self-powered, monetary transaction processing device.

11. The method of claim 1 further comprising sending a user a record of said monetary transaction.

12. The method of claim 1 in which said portable, self-powered monetary transaction processing device is a portable, self-powered, monetary transaction processing device.

13. A system for simplifying the management of a multiplicity of monetary transaction commitments comprising, a portable, self-powered, monetary transaction processing device having entering and recording means on said portable, self-powered, monetary transaction processing device for recording a plurality of monetary commitment data consisting of a numerical amount and indicia read from an information bearing card, a second device, and batch off-loading means for batch off-loading of said data from said portable, self-powered, monetary transaction processing device to said second device whereby recordation of each monetary transaction is uninterrupted by verification of validation and/or authorization.

14. The system according to claim 13 further including means for acknowledging said monetary transactions.

15. The system according to claim 13 further including means for entering credits to accounts for the monetary transactions to recipients of the monetary transactions, and entering debits to accounts for the monetary transactions to makers of the monetary transactions.

16. The system according to claim 13 in which the portable, self-powered, monetary transaction processing device is selected from the group consisting of remotely located portable, self-powered, personal computers, and remotely located portable, self-powered, hand held peripherals.

17. The system of claim 4 further comprising a monetary transaction record printing device.

18. The system of claim 4 in which said portable, self-powered monetary transaction processing device is a portable, self-powered, monetary transaction processing device.

19. A portable, self-powered, hand held monetary transaction processing device comprising entering and recording means on said portable, self-powered, hand held monetary transaction processing device for entering and recording a plurality of successive monetary commitment data consisting essentially of a numerical amount and indicia read from an information bearing card, and batch off-loading means for batch off-loading of said data from said portable, self-powered, hand held monetary transaction processing device to a second device whereby recordation of each monetary transaction is uninterrupted by verification of validation and/or authorization.

20. The device of claim 8 further comprising means for communicating the data in batch to a remote central processing location device.

* * * * *

UNITED STATES PATENT AND TRADEMARK OFFICE
CERTIFICATE OF CORRECTION

PATENT NO : 5,869,825
DATED : February 9, 1999
INVENTOR(S): Witold A. Ziarno

It is certified that error appears in the above-identified patent and that said Letters Patent is hereby corrected as shown below:

Column 24, line 49, "actions to" should be --actions of--.

Column 24, line 50, "transactions to" should be --transactions of--.

Column 24, line 56, "transaction device" should be --transaction processing device--.

Column 25, line 11, "portable" should be --hand held portable--.

Column 26, line 9, "claim 4" should be --claim 14--.

Column 26, line 11, "claim 4" should be --claim 14--.

Column 26, line 13, "portable" should be --hand held portable--.

Column 26, line 27, "claim 8" should be --claim 19--.

Signed and Sealed this

Twenty-ninth Day of June, 1999

Attest:

Q. TODD DICKINSON

*Attesting Officer*     *Acting Commissioner of Patents and Trademarks*